Oct. 31, 1967   W. H. SIMON   3,350,535
HERMETICALLY SEALED CONTAINER FOR WELDING ROD
Original Filed Dec. 2, 1960   3 Sheets-Sheet 1

INVENTOR.
Warner H. Simon

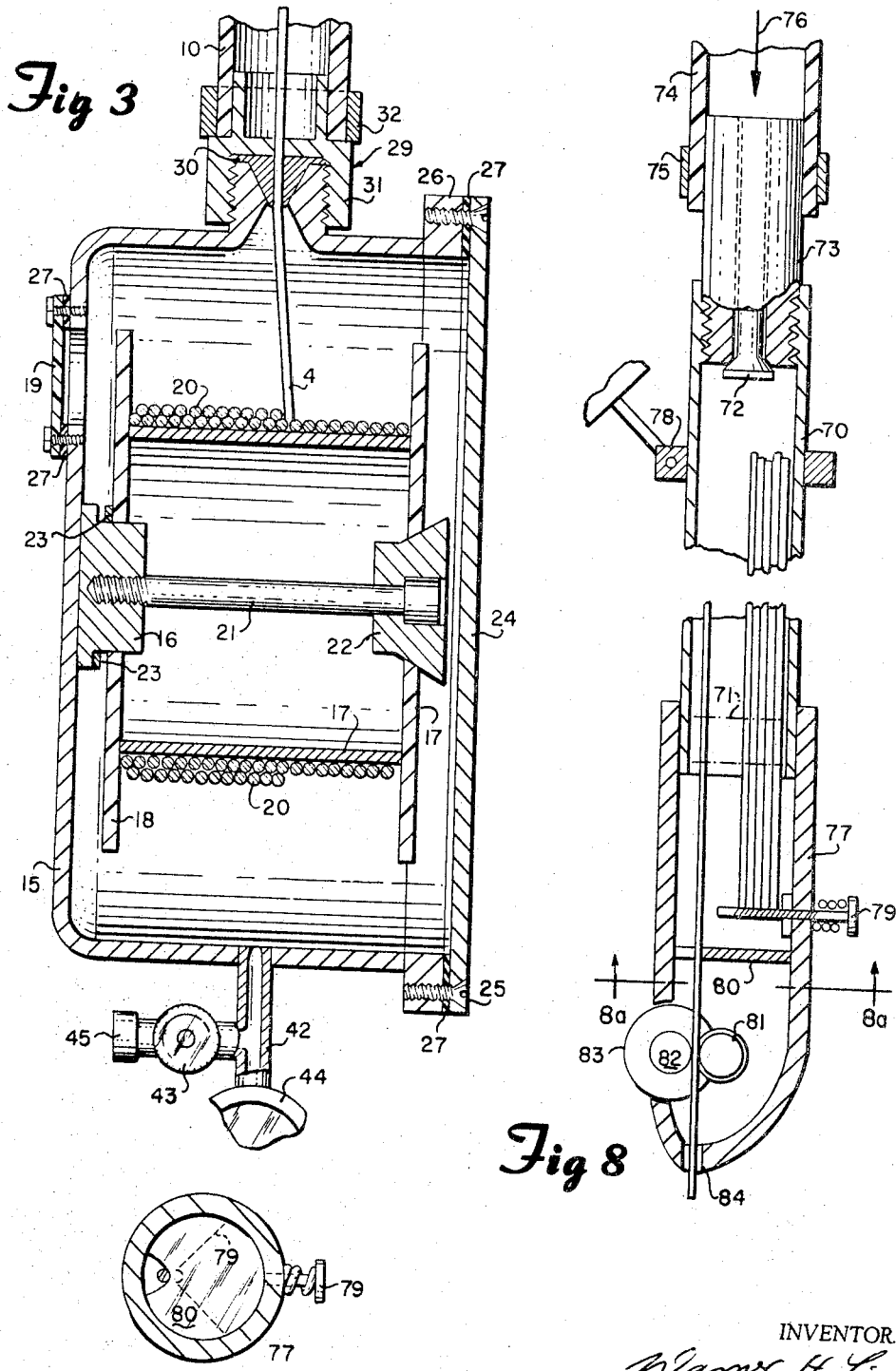

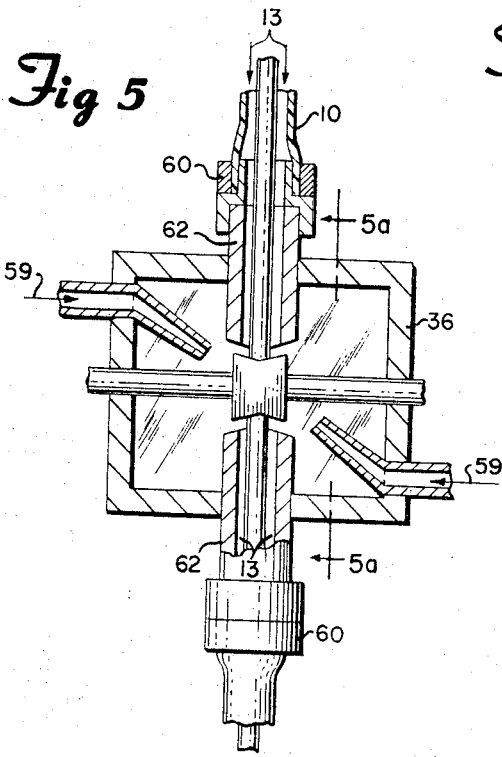
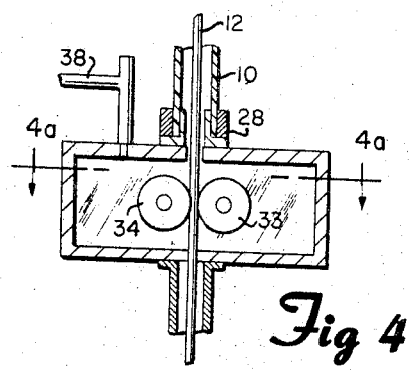
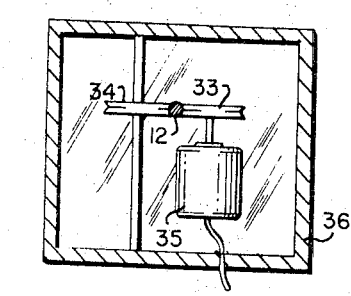
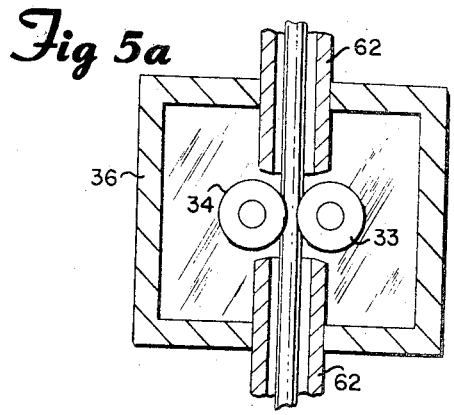
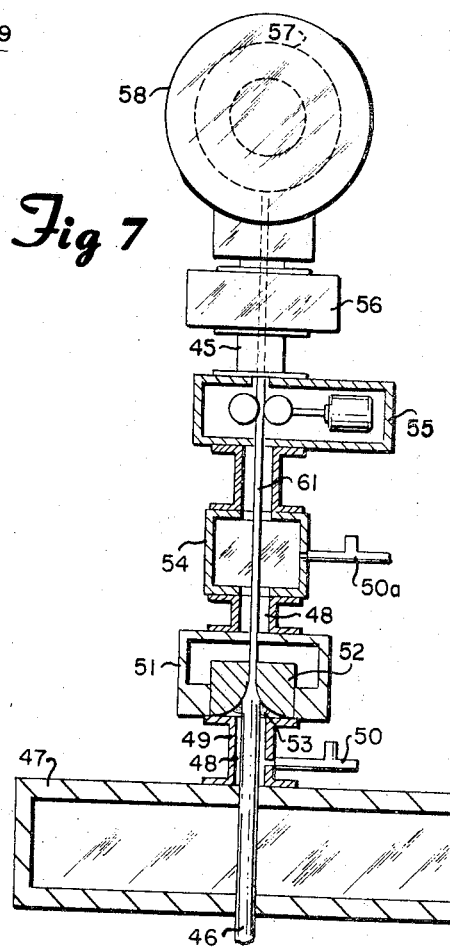

United States Patent Office 3,350,535
Patented Oct. 31, 1967

3,350,535
HERMETICALLY SEALED CONTAINER FOR WELDING ROD
Warner H. Simon 6511 Comanche Ave., Canoga Park, Calif. 91306
Original application Dec. 2, 1960, Ser. No. 73,257, now Patent No. 3,108,176, dated Oct. 22, 1963. Divided and this application Oct. 17, 1963, Ser. No. 317,090
3 Claims. (Cl. 219—74)

This application is a division of copending application Serial No. 73,257, filed December 2, 1960 now Patent No. 3,108,176.

This invention relates to the art of gas shielded arc welding and more particularly to improved welding methods and equipment wherein welding can be performed in a pure inert gas atmosphere free from foreign substances which interfere with the welding operation and the quality of welds.

It specifically applies to metals which are susceptible to contamination by traces of interstitial gases such as hydrogen and oxygen. Such metals have a high affinity to these gases, and the weld quality can be adversely affected even by minute traces of the gases.

My invention is concerned with the elimination of active elements briefly referred to as "contaminants," which term as used in the following specification and claims means elements or substances that will react with the particular metal or metals to be welded. Such contaminants may be either organic or inorganic substances.

The general object of this invention is the elimination of contaminants introduced into the weld from heretofore unknown factors responsible for unexplained inconsistencies in the weld. As I will show in the following description such heretofore unknown sources of contaminants can be reduced to one main source, namely the filler rod or wire. Thus it becomes the main object of my invention to exclude contaminants from the filler wire.

The present invention is applicable to materials such as aluminium, magnesium, low alloy high tensile steels, austenitic stainless steels, precipitation hardening stainless steels, and other metals. It is equally applicable to the welding of titanium, zirconium and reactive metals such as molybdenum and tunsten because of their high affinity to oxygen and hydrogen.

My invention relates to a method which will provide complete protection of the welding wire or rod continuously from the time it is manufactured until it is consumed at the welding arc. It also includes a special cleaning procedure. The rod is immediately put under controlled atmospheric conditions and packaged in hermetically sealed containers free from contaminants. Such contaminants, including hydrogen and oxygen often in the form of moisture, are excluded by pressurizing the container with a protective gas which is free of any elements that will react with the metal to be welded. Consequently, the filler rod is blanketed in the container during storage and use. A special feed nozzle is provided on the container through which the rod is drawn as it is used. This nozzle is of such design that it will transmit enough of the protective gas with the rod and will remain or help to maintain a blanket of protective gas around the rod as it is fed from the container to the arc. It will be apparent therefore from the foregoing and from the disclosure hereinafter that the invention also includes novel features of apparatus.

Protective gases contemplated for use in accordance with the present invention include argon and helium, commonly known as the inert gases. However, in welding certain metals carbon dioxide, dry air and even nitrogen may be used as the protective gas, so long as the gas used does not contain any elements or "contaminants" which will react with the metals being welded or with the filler wire or rod consumed at the weld.

Apparatus equipment suitable to employ in high purity welding in accordance with the present invention is shown by way of example and more or less schematically or diagrammatically in the accompanying drawings, wherein:

FIG. 3 is a cross-sectional view of the reel container taken on the line 3—3 of FIG. 1;

FIG. 4 is a detail view in vertical cross-section of the shielded feed mechanism shown in FIG. 1;

FIG. 4a is a section taken along the line 4a—4a of FIG. 4;

FIG. 5 is a detail view of a modified form of shielded feed mechanism;

FIG. 5a is a section taken along the line 5a—5a of FIG. 5;

FIG. 7 is a schematic illustration of a setup wherein the wire cleaning operation is performed during the manufacture of the filler wire or rod.

FIG. 8 is a view in longitudinal cross-section of a filler rod dispenser for straight cut-lengths of filler rod for manual welding operations.

FIG. 8a is a section taken along the line 8a—8a of FIG. 8.

Figure 1:
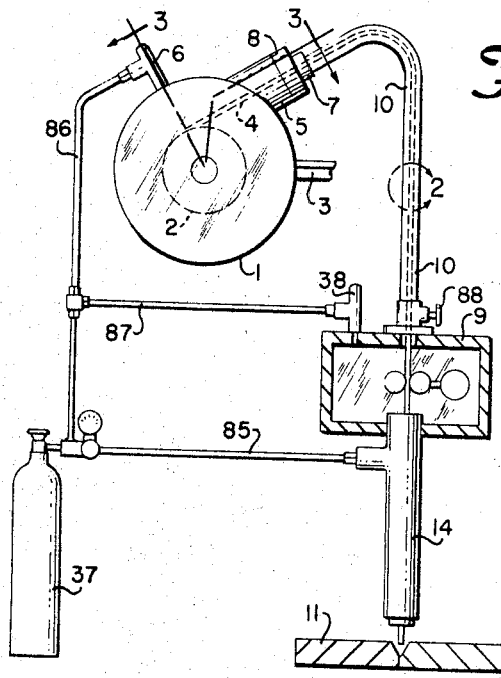
FIG. 1 is a side view in elevation of an automatic electric arc welding apparatus in accordance with the invention.

In FIG. 1 a spooled welding wire reel 2 is contained in a hermetically sealed reel housing 1 filled with inert gas and pressurized for greater protection. This device keeps the wire in perfectly clean condition, that is free from oxides, corrosion products, and organic deposits. Such contaminants would interfere with welding refractory and reactive metals. The spool can be loaded when the wire is manufactured immediately after it is cleaned and processed as shown in FIG. 7.

The reel housing 1 contains spool 2 on which is wound clean welding wire. The spool housing is mounted so that it is stationary on the frame 3 and the wire 4 is fed through the outlet nozzle assembly 5. This provides free movement of the wire through a seal when in operation and the wire can be locked in position and sealed when the machine is not in use. The inert gas flowing through outlet assembly 5 is replaced from a supply line 86 through an inlet assembly 6. The flexible conduit 10 is secured to a fitting 7 by means of a clamp 8 whereupon the wire passes through a wire feeder 9 to torch assembly 14. In case of very long conduits, with numerous fittings, the inert gas, such as argon, is also introduced through feed line 87 and inlet assembly 38 into the wire feeder 9. Inert gas is also introduced into the torch assembly 14 via line 85 in a conventional manner. A protective nonactive gas such as argon is supplied to all stations from the main supply 37. With this arrangement wire 12 reaches the area of the workpiece 11 without ever having come into contact with the ambient atmosphere. The wire feed assembly may be of the push or pull type, and the details of the invention adaptable to various types of wire feed mechanisms are shown in FIGS. 4 and 5.

In accordance with my invention, wire will be protected from the impure air or other contaminants at all times. During short shutdown periods such as lunch hours, the hose 10 can be protected by an annular stream of gas 13 (FIG. 2) and thus prevent contact with the ambient atmosphere. This requires that a nominal amount of inert gas pass through the hose. However, during long shutdown periods or extended storage, it is economical to shut off the gas supply to the hose assembly 10. The first portion of the wire 12 inside hose 10 should be discarded after an extended shutdown as it is contaminated by oxidation and deposition of organic substances which will contaminate the next weld. The gas outlet should be closed off in a convenient location by shutoff valve 88, otherwise during extended shutdown periods, the first portion of the wire remaining inside the tube during such shutdowns will have to be discarded as it is contaminated.

Figure 2:
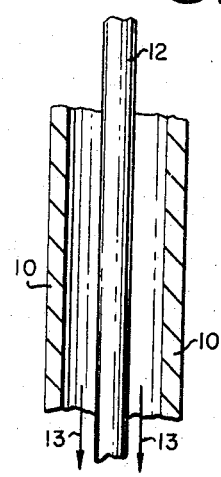
FIG. 2 is a vertical section through the flexible conduit taken on the line 2—2 of FIG. 1.

FIG. 2 shows a section through the flexible conduit. The filler wire 12 as it comes out of the outlet assembly 5 (FIG. 1) is in a perfectly clean condition, and is fed in the direction of the arrow. Continued protection is assured by maintaining an annular stream of inert gas 13 inside the flexible conduit 10.

FIG. 3 shows the details of the wire reel assembly or pressurized container. The example shown is so designed that standard equipment and spools can be used. The container consists of a housing 15, to which is secured a hub section 16 on which is mounted one flange 18 of a conventional spool 17 constructed of plastic, with the flange 18 of transparent plastic for the purpose of determining how much wire is left on the spool by viewing through the window 19 in the housing 15 of the container. A socket head cap screw 21 attaches the reel tension brake assembly 22 by exerting tension against a wavy space washer 23 to regulate the braking action of spool 17 against brake assembly 22 and hub assembly 16 thus controlling the tension of wire 4. The amount of tension required depends upon the type of wire material and the temper to which the wire has been drawn. (See item 61, FIG. 7.) Loading of the spool 17 into the housing will be done in inert atmosphere such as shown in item 58 (FIG. 7). Cover 24 is secured to housing 15 by means of screws 25 to flange 26 and sealed with a gasket 27. Outlet nozzle assembly 29 contains a pressure seal 30 actuated by an adjustable integral nut 31. The flexible conduit 10 is attached to outlet nozzle 29 by means of a hose fitting 32.

In use, the housing 15 is mounted on the welding apparatus, whereupon nut 31 is released so that the wire 4 can be inserted into the feed roll assembly 9 (FIG. 1) whereupon the welding operation can proceed in the conventional manner. The nut 31 can be replaced by an electronically controlled chuck assembly actuated by a relay (not shown) which can be energized by the welding current through a time delay relay. It will be apparent that by adjusting nut 31 or suitable controls for the chuck assembly, which can be used in place thereof, the amount of flow of protective gas from the pressurized wire container or magazine can be controlled.

The fact that spooling, cleaning and loading operations are generally performed in another location does not affect purity of the filler wire 4. In fact, an important feature of my invention is that during the storage of the wire container or in transit thereof, the gas shielding of the wire will be maintained as long as gauge 44, which forms a part of the inlet assembly 42, indicates a positive pressure above the atmospheric pressure. During operation, a hose fitting 45 is connected to the inert gas supply line which is readily available in the welding area. During storage periods, the housing is sealed off by means of shut-off valve 43.

FIGS. 4 and 4a show a feed mechanism in which the filler wire 12 is completely protected by inert gas in accordance with the principles of the invention. Feed rollers 33 and 34 are driven by a motor 35 enclosed in a housing 36. The whole mechanism is secured to the feed hoses by flange and gasket assemblies 28. An inlet assembly 38 is an optional attachment for highly critical applications to compensate for possible leakage of the protective gas from the flexible conduit 10 or where the pressure drop from inlet assembly at the wire magazine (FIG. 3) is excessive due to the length of conduit 10.

FIGS. 5 and 5a show an alternative method of providing gas shielding in accordance with my invention, applicable to those feed mechanisms which are not hermetically sealed. This is done by directing two lateral streams of inert gas to the feed rollers. In this arrangement, additional gas inlets 59 will compensate for the possible leakage of the gas (supplied by way of annular space 13 in conduit 10) between gear housing 36 and the drive motor. The fittings 60 connect conduit 10 to nozzles 62. It will be apparent therefore that the area of the feed rolls 33, 34, is blanketed by protective gas from nozzles 59.

Figure 6:
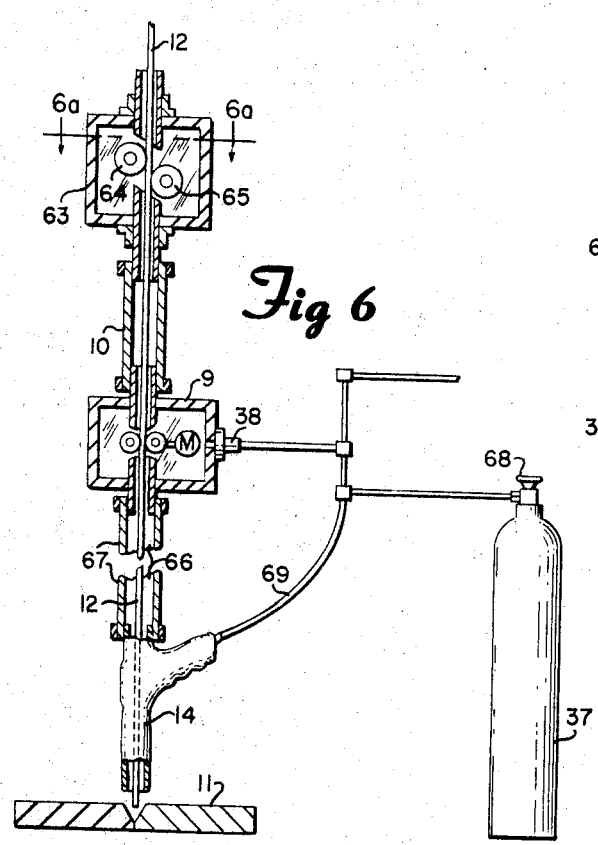
FIG. 6 is a schematic illustration of another type of welding apparatus in accordance with the invention.
Figure 6A:
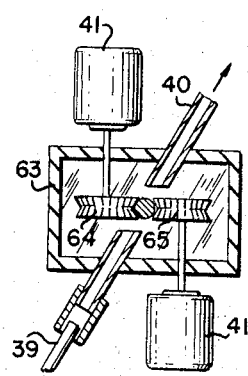
FIG. 6a is a section taken on the lines 6a—6a through the cleaning box shown in FIG. 6.

FIGS. 6 and 6a show a modification of the invention where it is incorporated in an automatic arc welding apparatus equipped with a mechanical cleaning device 63, which may be used in the event that filler wire cannot be obtained in the pressurized containers disclosed hereinafter. Cleaning rolls 64, 65 are driven by motors 41 perform a shaving operation on wire 12. Inert gas is introduced into inlet assembly 39 of the cleaning box and exhausted at outlet 40 in order to carry the contaminated chips into an exhaust mechanism. The clean rod or wire is then fed through a conduit 10 into feed roll assembly 9. In this instance, inlet assembly 38 for gas from the supply 37 is mandatory to assure protection, while it is an optional feature in the arrangement shown in FIG. 1. After the feed assembly 9, the inert gas shield 66 is maintained in conduit 67 until it reaches torch assembly 14, and continued protection of the welding rod 12 is therefore assured until it reaches workpiece 11. A valve 68 is provided in the gas system in order to control the inert gas flow from supply 37 to the various stations, including inlet 69 which supplies the torch assembly 14, and inlet 39 to the cleaning box 63.

FIG. 7 schematically shows the production of filler wire or rod in an atmosphere of protective gas from wire cleaning through spooling. The wire 46 is passed through a cleaning chamber 47 and then maintained in an inert gas shield 48 inside of housing 49. Gas is supplied from an inlet assembly 50 similar to items 6 and 38 of FIG. 1 The wire is then introduced into a drawing die 51 to complete the final drawing operation by means of a carbide nib 52. The drawing operation requires a non-active lubricant 53. The wire is then passed through an outlet nozzle assembly 48 similar to assembly 5 in FIG. 1 and then through a cleaning chamber 54. The wire drawing mechanism 55 provides tension for the finished draw operation, and may include a conventional wire drawing pull block (not shown), around which the wire is wrapped. A second gas inlet 50a is provided at the cleaning chamber 54 in order to introduce a shielding gas into the system of the drawing die 51. Similar gas inlets may be provided at various points along the path of the wire which is completely enclosed, so that the wire is blanketed by inert gas at all times during and after the final draw.

The wire 61 then passes through a wire straightener 45 and a level winding apparatus 56 to a wire spool 57 inside a reel housing 58 which is similar to the receptacle of FIG. 3 with the exception that the spool can be actuated by a drive mechanism so that the spooling can be accomplished within the housing. This will save reloading so that contact with the air and resultant contamination is avoided.

In lieu of the level winding equipment 56 and reel assembly 58, a cut-off arrangement may be provided to cut off the rods into straight cut lengths as required for manual welding. Then the rods are fed directly into tubular magazines to be described hereinafter, which are also loaded under inert gas shielding.

FIGS. 8 and 8a illustrate how the invention may be employed for manual welding operations. Magazine 70 serves as a controlled atmosphere shipping container as well as a dispenser for straight lengths of filler rod. The container is filled with inert gas and pressurized, both ends being sealed with plugs 71 (shown only on lower end in FIG. 8). Check valve 72 will assure continuous protection as a threaded fitting 73 is inserted to replace plug 71 at the upper end of magazine 70. Fitting 73 is attached to a hose 74 and secured with a clamp 75. Inert gas 76 passes through fitting 73 opening check valve 72 to magazine 70. Plug 71 is then replaced by nozzle assembly 77. The whole assembly is then suspended on a suspension ring 78 and each rod is released by means of dispenser 79 and guide baffle 80 into feed rolls 81 and 82. The outer feed roll 82 is equipped with an actuated knurled wheel 83 to effect the manual feeding of the rods through nozzle 84.

What is claimed is:

1. In an arc welding device the combination comprising; a container having disposed therein a filler rod, said container comprising an hermetically sealed housing, nozzle means mounted on said housing through which said filler rod can be fed from said container, means providing a shielding gas in said container, a pressure-sensitive device mounted on said housing and communicating with the interior thereof for indicating loss of gas from said container and means for feeding said filler rod to a welding zone.

2. In an arc welding device the combination comprising; a container having disposed therein a filler rod, said container including an hermetically sealed housing, nozzle means mounted on said housing through which said filler rod can be fed from said container, means providing a shielding gas in said container, and means or permitting viewing of the filler rod within the housing.

3. Apparatus for arc welding comprising: an elongated hermetically sealed housing having disposed therein filler rod and an atmosphere non-contaminating with respect to said filler rod, a removable closure member at one end of said housing, closure means at the other end of said housing including valve means permitting the flow of arc shielding gas into said housing, said closure means being adapted for connected with a shielding gas conduit and said one end of said housing being adapted for connection with a nozzle having means for feeding filler rod to the weld zone whereby connection of said closure means with the shielding gas conduit, removal of said removable closure member, and connection of said nozzle with said one end of said housing results in the feeding of uncontaminated filler rod to the weld zone.

References Cited

UNITED STATES PATENTS

| | | | |
|---|---|---|---|
| 423,674 | 3/1890 | Day | 242—83 |
| 1,103,382 | 7/1914 | Seifert | 205—2 |
| 2,678,863 | 5/1954 | Atkinson et al. | 206—59 X |
| 2,681,401 | 6/1954 | Anderson | 219—130 |
| 2,681,402 | 6/1954 | Muller | 219—74 |
| 2,829,236 | 4/1958 | Miles | 219—74 |
| 2,963,570 | 12/1960 | Rieppel | 219—74 |

FOREIGN PATENTS 144,201  11/1951  Australia.

JOSEPH V. TRUHE, *Primary Examiner.*

ANTHONY BARTIS, *Examiner.*